(12) United States Patent
Suzuki et al.

(10) Patent No.: US 9,467,755 B2
(45) Date of Patent: Oct. 11, 2016

(54) OPTICAL SWITCH

(71) Applicant: NIPPON TELEGRAPH AND TELEPHONE CORPORATION, Tokyo (JP)

(72) Inventors: Kenya Suzuki, Atsugi (JP); Yuzo Ishii, Atsugi (JP); Koichi Hadama, Atsugi (JP); Kazunori Seno, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 40 days.

(21) Appl. No.: 14/417,604

(22) PCT Filed: Aug. 30, 2013

(86) PCT No.: PCT/JP2013/005154
§ 371 (c)(1),
(2) Date: Jan. 27, 2015

(87) PCT Pub. No.: WO2014/034142
PCT Pub. Date: Mar. 6, 2014

(65) Prior Publication Data
US 2015/0222967 A1    Aug. 6, 2015

(30) Foreign Application Priority Data

Aug. 30, 2012 (JP) ................. 2012-190405
Dec. 7, 2012 (JP) ................. 2012-268664

(51) Int. Cl.
*H04Q 11/00* (2006.01)
*G02B 6/35* (2006.01)

(52) U.S. Cl.
CPC ......... *H04Q 11/0003* (2013.01); *G02B 6/3566* (2013.01); *H04Q 11/0005* (2013.01); *H04Q 2011/0024* (2013.01)

(58) Field of Classification Search
CPC ................. H04Q 11/0004; H04Q 2011/0024
See application file for complete search history.

(56) References Cited

U.S. PATENT DOCUMENTS

| | | | |
|---|---|---|---|
| 6,175,443 B1 * | 1/2001 | Aksyuk ................ | G02B 6/3518 359/290 |
| 7,092,599 B2 | 8/2006 | Frisken | |
| 2002/0061161 A1 * | 5/2002 | Tsiboulia ............. | G02B 6/3516 385/18 |

(Continued)

FOREIGN PATENT DOCUMENTS

| | | |
|---|---|---|
| CN | 1417606 A | 5/2003 |
| CN | 1797062 A | 7/2006 |

(Continued)

OTHER PUBLICATIONS

International Preliminary Report on Patentability and Written Opinion in corresponding application No. PCT/JP2013/005154 dated Mar. 3, 2015.

(Continued)

*Primary Examiner* — Nathan Curs
(74) *Attorney, Agent, or Firm* — Workman Nydegger

(57) ABSTRACT

An optical switch includes an input port, output ports, and a spatial light modulating section that receives an optical signal from the input port to deflect the optical signal to a selected one of the output ports. A phase distribution with the same radius of curvature as that of a wavefront of the optical signal and a phase distribution that allows the deflected optical signal to be coupled to the output port are set for the spatial light modulating section.

13 Claims, 15 Drawing Sheets

(56) References Cited

U.S. PATENT DOCUMENTS

| | | | |
|---|---|---|---|
| 2002/0090169 A1* | 7/2002 | Ducellier | G02B 6/3556 385/18 |
| 2003/0053744 A1 | 3/2003 | Makio | |
| 2003/0138205 A1* | 7/2003 | Dragone | G02B 6/12011 385/37 |
| 2004/0085656 A1 | 5/2004 | Giles et al. | |
| 2006/0140536 A1 | 6/2006 | Aota et al. | |
| 2008/0298738 A1 | 12/2008 | Ishikawa et al. | |
| 2009/0147330 A1 | 6/2009 | Seo et al. | |
| 2010/0149647 A1* | 6/2010 | Figueroa | G01J 3/02 359/615 |
| 2010/0316385 A1 | 12/2010 | Suzuki et al. | |
| 2011/0233406 A1* | 9/2011 | Majewski | G01N 21/031 250/338.1 |
| 2012/0170930 A1* | 7/2012 | Komiya | G02B 6/3546 398/34 |
| 2014/0355985 A1* | 12/2014 | Chu | G02F 1/292 398/49 |

FOREIGN PATENT DOCUMENTS

| | | |
|---|---|---|
| JP | 2001-194600 | 7/2001 |
| JP | 2006-113185 | 4/2006 |
| JP | 2008-298865 | 12/2008 |
| WO | 2009/104715 | 8/2009 |

OTHER PUBLICATIONS

International Search Report in related Application No. PCT/JP2013/005154, dated Oct. 1, 2013.

Chinese Office Action dated Apr. 25, 2016, issued in Chinese Application No. 201380045824.4.

* cited by examiner

OPTICAL SWITCH

TECHNICAL FIELD

The present invention relates to a wavelength selective switch used for an optical communication network.

BACKGROUND ART

With the explosive spread of data communication networks such as the Internet, needs for higher capacities of optical communication networks are being increasingly growing. To address the growing network needs, wavelength division multiplexing communication has been put to practical use. In recent years, there have also been growing needs for wavelength selective switches (WSSs) that enable channel switching at each wavelength. A conventional wavelength selective switch is disclosed in PTL 1.

FIG. 10 a diagram depicting an example of the wavelength selective switch disclosed in PTL 1. In FIG. 10, a wavelength division multiplexing signal received through one of input and output optical fibers 1 to 10 propagates along a forward optical path 28 shown by a solid line while being diverged. The signal is converted into parallel beams by a concave mirror 12, and the parallel beams travel along a forward optical path 27 and enter a diffraction grating 14. The wavelength division multiplexing signal having entered the diffraction grating 14 is angularly diverged by the diffraction grating 14 and thus diffracted in different directions depending on the wavelength. The signal thus propagates in the direction of an optical path 23 shown by a solid line. The propagated optical signal is converted by a cylinder lens 13 into a condensed beam in a direction perpendicular to the sheet of FIG. 10. The condensed beam enters the convex mirror 12. At this time, the beam enters the convex mirror 12 as parallel beams in a wavelength demultiplexing direction (in a horizontal direction on the sheet of FIG. 10) and as a convergent beam in a switch axis direction (in a vertical direction in the sheet of FIG. 10). Thus, a beam waist is formed on a concave lens 13.

The optical signal reflected by the concave mirror then propagates as a dispersive beam in the vertical direction in the sheet of FIG. 10 and enters the cylinder lens 13 again. The beam is then converted by the cylinder lens 13 into parallel beams, which enter a spatial deflection element 15. On the other hand, in the wavelength demultiplexing direction (in the horizontal direction in the sheet of FIG. 10), the beams become a condensed beam, which is reflected by the concave mirror 12 and propagates directly toward the spatial deflection element 15.

CITATION LIST

Patent Literature

PTL 1: U.S. Pat. No. 7,092,599

SUMMARY OF INVENTION

Technical Problem

In the optical system in PTL 1, the distance from the input and output optical fibers 1 to 10 to the spatial deflection element 15 is four times as long as the focal distance of the concave mirror 12. In other words, the distance is approximately double the cylinder lens 13. This long distance limits the size of the optical system of the wavelength selective switch as a whole. That is, the optical switch has failed to be miniaturized.

FIG. 15A and FIG. 15B are diagrams illustrating the principle of switching of a conventional wavelength selective switch. FIG. 15A depicts how phase changes with respect to an input. FIG. 15B depicts how high-order diffracted light is generated.

In the conventional wavelength selective switch, a spatial phase modulating element includes pixelated phase modulating elements (typically LCOS: Liquid Crystal On Silicon) provided thereon, and a phase of 0 to $2\pi$ may be set for each of the pixels. An incident optical signal has its phase modulated (shifted) by the set phase for each position, and is then reflected. In the conventional wavelength selective switch, the phase changes linearly with respect to the position as shown in FIG. 15A, and switching is implemented by performing phase modulation using a serrodyne wave with the phase amplitude thereof turned back at $2\pi$. However, in this switching scheme, the phase changes continuously during a phase change from $2\pi$ to 0 due to the incompleteness of the serrodyne wave. Thus, high-order diffracted light is generated.

The example in FIG. 15B illustrates a Fourier plane with respect to the spatial light phase modulating element 15, that is, generation of high-order diffracted light. In other words, the example illustrates a condition on a spatial frequency axis. In FIG. 15B, first-order light is a main signal, and for example, output ports 1 to 10 are disposed at this position.

In contrast, an area denoted as second-order light corresponds to high-order diffracted light, which may cause crosstalk. Thus, no output port can be disposed at the position of the second-order light. The second-order diffracted light is generated at a position corresponding to the double of the distance from 0th-order diffracted light to the first-order diffracted light. Consequently, the area in which ports can be disposed is limited to the range of an area A. In other words, no port can be disposed within the range of an interior angle-side area D, and thus, the number of ports is reduced by half. In other words, when the needed number of ports is determined, an area A of a given size needs to be provided. The area D also needs to have the same width as that of the area A. Accordingly, the width in a port direction (the direction of X in FIG. 15B) needs to be at least double the width of the area A. The direction of X determines the height of the wavelength selective switch, disadvantageously leading to a higher-profile module.

In view of the aforementioned circumstances, it is an object of the present invention to provide an optical switch that can be miniaturized.

Solution to Problem

To accomplish the object, the present invention includes at least one input port, at least one output port, and a spatial light modulating section receiving an optical signal from the input port to deflect the optical signal to a selected one of the output ports. A phase distribution is set for the spatial light modulating section, the phase distribution including a superimposition of a phase distribution that compensates for a radius of curvature of a wavefront of the optical signal obtained at a time of incidence and a phase distribution that allows the deflected optical signal to be coupled to the output port.

In this regard, an end of the selected output port may be disposed on a principal beam of the reflected optical signal.

The input ports and the output ports may be formed in an optical waveguide on a substrate.

The present invention may further include an optical lens disposed between the spatial light modulating section and the input ports and the output ports.

A distance between the optical lens and the spatial light modulating section may be set to be identical to a focal distance of the optical lens.

A distance between the optical lens and the input ports and the output ports may be set to be different from a Rayleigh length of a virtual beam waist with respect to an optical signal entering the spatial light modulating section.

The present invention may include a spectroscopic element disposed between the spatial light modulating section and the input ports and the output ports.

The input ports and the output ports maybe provided on an identical straight line, and a spectroscopic surface of the spectroscopic element and the straight line may be provided along a normal of the demultiplexing surface.

Alternatively, an optical directional coupler, a multimode interference coupler, a Mach-Zehnder interferometer, or the like maybe disposed at the input ports and output ports formed in the optical waveguide, and light receiving elements may be provided at ports branching from the input ports and output ports.

The radius of curvature of the wavefront of the optical signal at the time of incidence on the spatial light modulating section may have a finite value instead of infinity.

A phase distribution with a constant phase applied over an entire surface of the spatial light modulating section maybe set for the spatial light modulating section, in addition to a superimposition of a phase distribution with the radius of curvature identical to the radius of curvature of the wavefront of the optical signal obtained at the time of incidence on the spatial light modulating section and a phase distribution that allows a principal beam of the optical signal to be directed toward the selected output port when the optical signal exits the spatial light modulating section.

The constant phase may be determined such that a non-ideal point for the phase set for the spatial light modulating section minimizes a degree of contribution weighted by an intensity distribution of the optical signal entering the spatial light modulating section.

Advantageous Effects of Invention

According to the present invention, an optical switch can be miniaturized which performs wavelength switching in wavelength division multiplexing communication.

Compared to the conventional scheme, the present invention enables the number of switch ports to be doubled. Moreover, worsening of crosstalk can be suppressed which results from incompleteness of a spatial light modulating element.

DESCRIPTION OF EMBODIMENTS

A first to a fifth embodiments of the present invention will be described below with reference to the drawings.

<First Embodiment>

Figure 1:
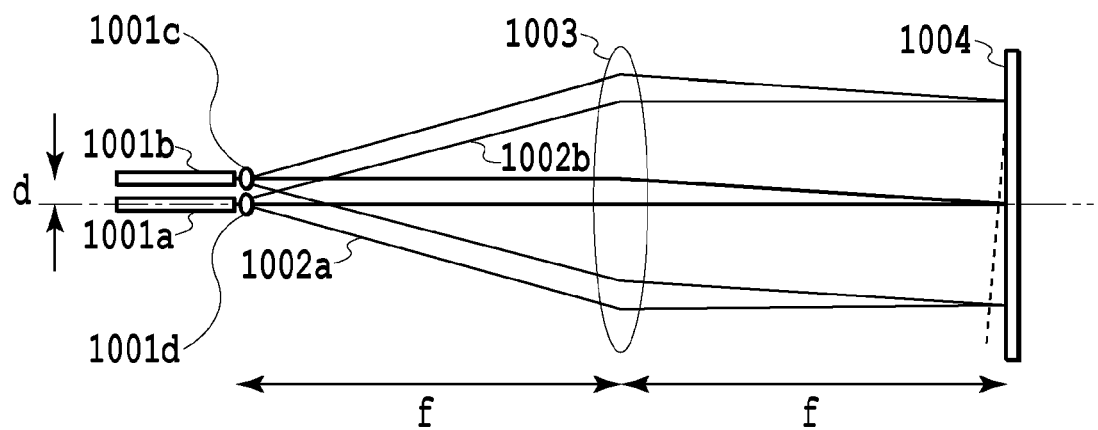
FIG. 1 is a diagram illustrating an optical path in a switching direction in a conventional common optical switch.
Figure 2:
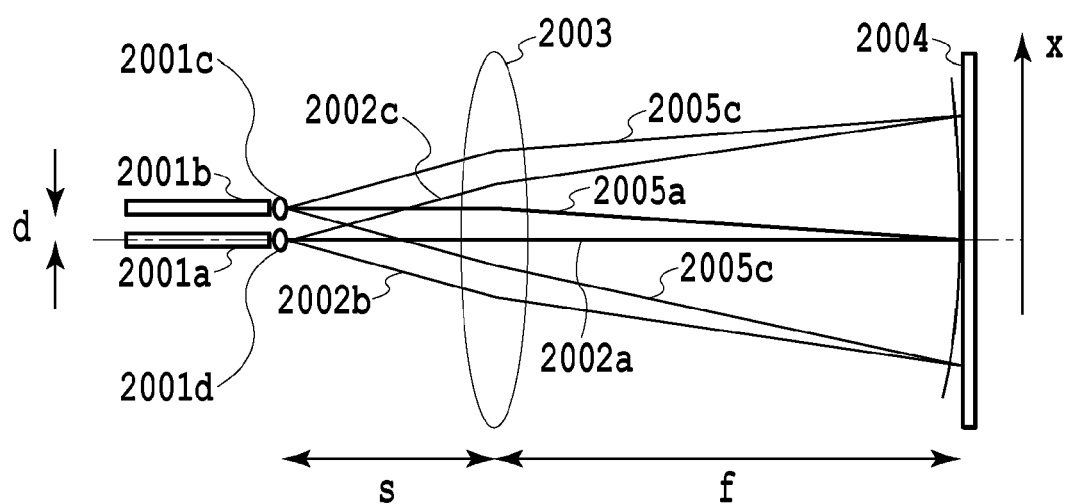
FIG. 2 is a diagram illustrating an optical path in a switching direction in an optical switch according to a first embodiment.

A configuration example of an optical switch according to a first embodiment can be miniaturized in contrast to a conventional common optical switch. The configuration example of the optical switch according to the first embodiment will be described below with reference to FIG. 1 and FIG. 2 so as to indicate differences from the conventional common optical switch. FIG. 1 is a diagram illustrating an optical path in a switching direction in the conventional common switch. FIG. 2 is a diagram illustrating an optical path in a switching direction in the optical switch according to the first embodiment.

First, a configuration of an optical switch of a conventional common 2f optical system will be described with reference to FIG. 1. In the 2f optical system shown in FIG. 1, the focal distance of a lens 1003 is set to (f), and a distance from the lens 1003 to an input port 1001a and an output port 1001b (hereinafter also referred to as the input and output ports 1001a and 1001b) is also set to (f).

The input and output ports 1001a and 1001b are disposed at a front focal position (on an object surface side) of the lens 1003. Micro lenses 1001c and 1001d are provided in association with the input and output ports 1001a and 1001b, respectively. The micro lenses 1001c and 1001d enable the numerical aperture of exit beams to be controlled.

In this optical system, an optical signal output through the input port 1001a propagates as diverging light as shown by reference numerals 1002a and 1002b until the optical signal reaches the lens 1003. Then, the optical signal having passed through the lens 1003 enters a spatial light modulating section 1004 as parallel beams. The spatial light modulating section 1004 performs light deflection needed for port selection to reflect the optical signal. The spatial light modulating section 1004 may be, for example, an LCOS (Liquid Crystal on Silicon) with a liquid crystal provided on a CMOS (Complimentary Metal Oxide Semiconductor). The LCOS is an optical phase modulator with a large number of fine pixels and enables phase shifting to be applied to incident light depending on any wavelength.

A deflection angle needed by the spatial light modulating section 1004 to couple the optical signal to the output port 1001b is expressed by Equation (1).

$$\theta = \arctan(d/f) \quad (1)$$

In Equation (1), d denotes a distance between the input and output ports 1001a and 1001b, and (f) denotes the focal distance of the lens 1003.

A principal beam of the optical signal output through the input port 1001a shown in FIG. 1 is parallel to a principal beam of the optical signal reflected toward the output port 1002b by the spatial light modulating section 1004. Thus, the input and output ports 1001a and 1001b are disposed parallel to each other as shown in FIG. 1. Thus, this optical system allows layout and implementation of the input and output ports to be simplified.

The 2f optical system shown in FIG. 1 has an overall length set to, for example, 2f. In this example, the distance from the lens 1003 to the input and output ports 1001a and 1001b is the same as the focal distance (f) of the lens 1003. Thus, the distance between the spatial light modulating section 1004 and the input and output ports 1001a and 1001b is 2f. This limits miniaturization of the optical switch.

On the other hand, in an example of an optical switch of an optical system shown in FIG. 2, the optical system has an overall length set to, for example, (s+f), unlike in the optical system shown in FIG. 1. A lens 2003 has a focal distance (f) similar to the lens 1003 shown in FIG. 1. However, the distance from the lens 2003 to an input port 2001a and an output port 2001b (hereinafter also referred to as the "input and output ports 2001a and 2001b") is different from the distance in the optical switch in FIG. 1. That is, the distance between the lens 2003 and the input and output ports 2001a and 2001b is set to, for example, s(<f). Thus, the optical system has an overall length smaller than 2f. Therefore, the optical switch allows miniaturization to be implemented.

The optical system shown in FIG. 2 will be described below in detail. As shown in FIG. 2, in the optical system, the input and output ports 2001a and 2001b are disposed in proximity to the lens 2003 side. Also in this case, an optical signal from the input port 2001a travels toward the lens 2003 as diverging beams as shown by reference numerals 2002b and 2002c. Then, the optical signal having passed through the lens 2003 enters a spatial light modulating section 2004 as diverging beams. In the description below, the spatial light modulating section 2004 is, for example, an LCOS (Liquid Crystal on Silicon) (first to fourth embodiments). However, for example, a grating light valve MEMS (Micro Electro Mechanical System) is applicable as the spatial light modulating section 2004. Furthermore, in the first embodiment, the reflective LCOS will be described by way of example. However, a transmissive spatial light modulating element such as a transmissive LCOS may be used.

The first embodiment notes that the distribution of phase spaces on the LCOS can be flexibly set and allows the spatial light modulating section 2004 to have a phase distribution as described below. Specifically, a wavefront entering the LCOS and having a radius of curvature is provided with a phase with a two-dimensional spatial distribution so as to be reflected with a similar radius of curvature, thus equivalently forming a concave mirror. This is one of the characteristics of the optical switch according to the first embodiment.

Preferably, the radius of curvature of the spatial distribution of the phase provided to the LCOS serving as the spatial light modulating section 2004 is, for example, equal to the radius of curvature of the wavefront of the optical signal entering the spatial light modulating section 2004.

Figure 3:
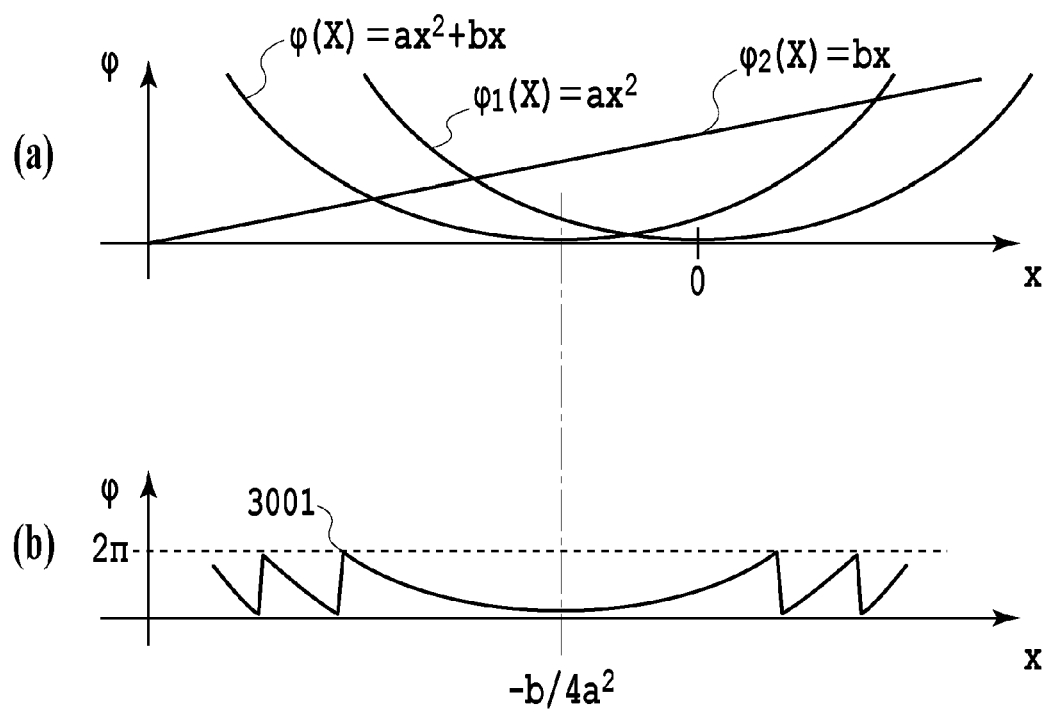
FIG. 3 is a diagram illustrating a phase distribution on an LCOS serving as a spatial light modulating section in FIG. 2.

Moreover, since beam deflection needed for port selection needs to be applied to the spatial light modulating section 2004 as is the case with the optical system shown in FIG. 1, a phase distribution φ(x) applied to the spatial light modulating section 2004 is expressed by Equation (2) based on a superimposition of φ1(x) and φ2(x) shown in FIG. 3.

$$\phi(x) = ax^2 + bx \quad (2)$$

In Equation (2), (a) denotes a second-order component corresponding to the radius of curvature of the wavefront of the optical signal, and (b) denotes a first-order component needed for port selection.

FIG. 3 is a diagram illustrating the phase distribution of the spatial light modulating section 2004. FIG. 3(a) depicts the phase distribution, and FIG. 3(b) depicts how phase shifting occurs.

φ1 shown in FIG. 3(a) denotes a component of curvature compensation for the wavefront of the optical signal, and φ2 denotes a component needed for beam deflection. In this example, $\phi1(x)=ax^2$ and $\phi2(x)=bx$ are set.

φ(x) shown in Equation (2) results from shifting of $\phi(x)=ax^2$ in the direction of an x axis, for example, by −b/2a.

The phase distribution φ(x) illustrated in Equation (2) is set for the spatial light modulating section 2004. Thus, a principal beam 2002a of the optical signal traveling toward the output port 2001b takes an optical path shown in FIG. 2 by reference numeral 2005a. This depends on a second term (bx) of a right side of Equation (2).

In FIG. 2, the optical signal is propagated to the output port 2001b with the beam shape of the optical signal converging as shown in FIG. 2 by reference numerals 2005b and 2005c. The optical signal is eventually condensed at the output port 2001b.

Here, for the coefficient (a) of the first term of the right side of Equation (2), the optimum value varies depending on a distance (s) from the input and output ports 2001a and 2001b to the lens 2003. Also, in the optical system shown in FIG. 2, the optical signal from the input port 2001a is formed as a Gauss beam. Thus, based on how the Gauss beam enters the lens 2003, the radius of curvature of the wavefront of the beam entering the spatial light modulating section 2004 can be determined.

In general, when the focal distance of the lens 2003 is denoted by (f), the distance from the lens 2003 to an object is denoted by d1, and the distance from the lens 2003 to an image is denoted by d2, an ABCD matrix of the beam is expressed by Equation (3).

$$\begin{bmatrix} A & B \\ C & D \end{bmatrix} = \begin{bmatrix} 1 & d_2 \\ 0 & 1 \end{bmatrix} \begin{bmatrix} 1 & 0 \\ -1/f & 1 \end{bmatrix} \begin{bmatrix} 1 & d_1 \\ 0 & 1 \end{bmatrix} \quad (3)$$

$$= \begin{bmatrix} 1 - d_2/f & d_1 + d_2 - (d_1 + d_2)/f \\ -1/f & 1 - d_1/f \end{bmatrix}$$

As is known, given a beam waist of the beam before passage through the lens is present at a position at a distance d1 from the lens 2003 and when the beam waist is present again at a position at a distance d2 from the lens 2003, the waist position of the Gauss beam before passage through the lens and the waist position of the Gauss beam after passage through the lens have a relation as represented by Equation (4) (see, for example, pages 23 to 28 of "Basis and Application of an Optically Coupled System" authored by Kenji Kawano, Gendaikogakusha).

$$AC + \left(\frac{\lambda}{\pi \omega_0^2}\right)^2 BD = 0 \quad (4)$$

From this relation, the position of the beam waist after passage through the lens is expressed by Equation (5).

$$d_2 = \left(\frac{1}{f} - \gamma d_1 + \frac{\gamma d_1^2}{f}\right) / \left(\frac{1}{f^2} + \gamma - \frac{2\gamma d_1}{f} + \frac{\gamma d_1^2}{f^2}\right) \quad (5)$$

In Equation (5), γ is expressed by Equation (6).

$$\gamma = \left(\frac{\lambda}{\pi \omega_0^2}\right)^2 \quad (6)$$

In Equation (6), λ denotes the wavelength of the optical signal and $\omega_0$ denotes the size of the beam waist at the input port.

In view of the above, the radius of curvature of the wavefront of the optical signal incident on the spatial light modulating section 2004 is determined as follows. That is, calculating Equation (5) with d1=s to determine d2 results in a virtual beam waist of the optical signal after passage through the lens.

In the example of the optical system shown in FIG. 2, the d2 has a negative value, and the beam waist is present on the left of the lens 2003 in the sheet of FIG. 2, that is, on an object side of the lens 2003. Thus, the radius of curvature R of the wavefront of the optical signal entering the spatial light modulating section 2004 is expressed by Equation (7).

$$R = f - d2 \quad (7)$$

In Equation (7), d2 denotes a negative value.

For the spatial light modulator such as the LCOS, a settable phase has an upper limit value. In general, the optical signal has a phase of approximately 2π. When the needed amount of phase shift exceeds the upper limit value, the amount of phase shift is turned back, for example, at every 2π so as to be smaller than the upper limit vale as shown in FIG. 3(b). In the description of FIG. 3(b), the amount of phase shift is turned back at every 2π. However, the turn-back need not necessarily occur at 2π, but the height (φ) of the turn-back of the phase shown by reference numeral 3001 may be an integral multiple of 2π.

The turn-back of the phase as shown in FIG. 3(b) may increase losses resulting from diffraction of light. Near the turn-back of the phase 2π shown by reference numeral 3001 in FIG. 3(b), an area of a finite width is present where, instead of the discrete turn-back at 2π, analog changes in phase occur in accordance with the degrees of interference of electric fields and follow-up of liquid crystal elements at a phase of 0 and at a phase of 2π. The area may cause a loss, and thus, such turn-backs are preferably reduced.

The number of turn-backs at a phase of 2π increases with decreasing radius of curvature illustrated in Equation (7). In other words, it is not preferable to maximize the radius of curvature of the wavefront of the Gauss beam. Such a condition is established when the spatial light modulator 2004 is located at the position of a Rayleigh length of the Gauss beam. Thus, the LCOS serving as the spatial light modulator 2004 needs to avoid being provided at the position of the Rayleigh length.

In the first embodiment, the case where the number of output ports is one has been described by way of example. However, two or more (a plurality of) output ports may be provided. Port selection in the case of a plurality of output ports is implemented by appropriately changing (b) in Equation (2).

Figure 4:
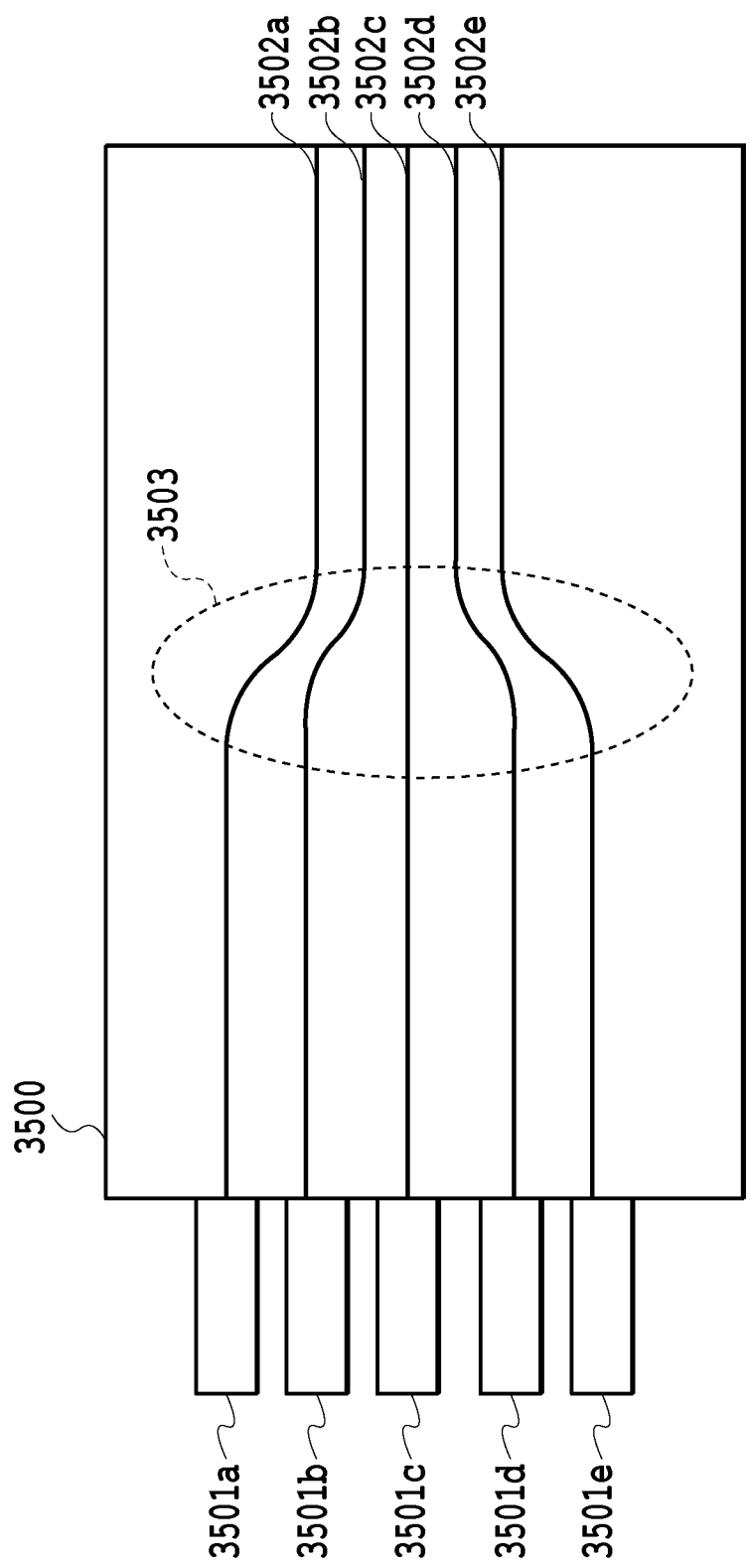
FIG. 4 is a diagram illustrating an example that utilizes input and output ports formed on an optical waveguide substrate.

Moreover, the input and output ports can be implemented using an optical waveguide fabricated on the substrate. FIG. 4 is a diagram illustrating an example utilizing input and output ports formed on an optical waveguide substrate 3500. Optical fibers 3501a to 3501e are connected to the optical waveguide substrate 3500. Optical signals from the optical fibers 3501a to 3501e are coupled to input and output ports 3502a to 3502e formed on the optical waveguide substrate 3500. A bending waveguide 3503 connected to the input and output ports 3502a to 3502e reduces the intervals (pitches) between the input and output ports 3502a to 3502e to allow optical outputs from the input and output ports 3502a to 3502e to be transmitted into the space.

In general, the optical fiber is 125 μm in outer diameter, and thus, the intervals between the input and output waveguides are affected by the size of the outer diameter of the optical fiber. Thus, the intervals between the input and output waveguides are limited. On the other hand, in the optical waveguide shown in FIG. 4, the bending waveguide 3503 advantageously allows the pitch on the output port side to be optionally set.

As described above, the optical switch according to the first embodiment sets the phase distribution for the spatial light modulator 2004 so that the phase distribution of the same radius of curvature as that of the wavefront of the incident light is superimposed on the phase distribution of the principal beam of the reflected light. Thus, light from the input port 2001a is reflected by the spatial light modulator 2004 via the lens 2003, and the reflected light is condensed at the output port 2001b. This allows a reduction in the overall length of the optical system. Hence, the optical switch can be miniaturized.

<Second Embodiment>

Now, an optical switch according to a second embodiment will be described.

The case where the optical switch shown in FIG. 2 has the lens 2003 has been described. The lens 2003 exerts the following effects. That is, (1) the lens 2003 and the spatial light modulator 2004 are placed at the distance (f) illustrated in FIG. 2 to enable the input and output ports 2001a and 2001b to be disposed parallel to each other, simplifying the layout of the optical system. (2) The divergence of the beams is suppressed to some degree to limit the area of the beams entering the spatial light modulator 2004. Alternatively, the optical switch may be configured not to include the lens 2003. The switch configured not to include the lens 2003 is shown in FIG. 5.

Figure 5:
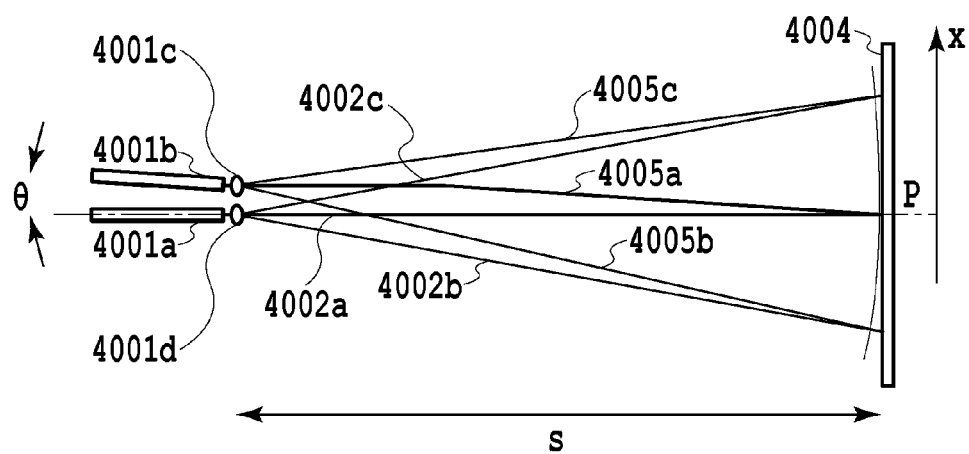
FIG. 5 is a diagram illustrating an optical path in a switching direction in an optical switch according to a second embodiment.

FIG. 5 is a diagram illustrating an optical path in a switching direction in the optical switch according to the second embodiment.

In the optical switch shown in FIG. 5, an input port 4001a and an output port 4001b (hereinafter referred to as the "input and output ports 4001a and 4001b") are disposed at any positions, and the above-described lens 2003 is not provided. In the second embodiment, there is a distance (s) between a spatial light modulator 4004 and the input and output ports 4001a and 4001b. In this case, the input and output ports 4001a and 4001b are an optical waveguide formed on a substrate. This enables positioning with accuracy achieved by photolithography, while allowing the output direction of light to be optionally set, and is thus preferable for implementing the optical switch according to the second embodiment.

In FIG. 5, an optical signal output through the input port 4001a propagating to the spatial light modulator 4004 while being diverged. In this case, the principal beam of the optical signal is as shown by reference numeral 4002a and has such a divergence as shown by reference numerals 4002b and 4002c.

The spatial light modulator 4004 has a deflection function set thereon and needed for port selection and the function of a concave mirror set thereon and needed for beam shaping as is the case with the first embodiment. In this case, the principal beam of the optical beam reflected by the spatial light modulator 4004 is as shown by reference numeral 4005a. Beams propagate to the output port 4001b with the shape of the beams converging as shown by reference numerals 4005a and 4005c. In this case, the output port 4001b is disposed such that the waveguide and the principal beam 4005a are located on the same straight line, so as to maximize the efficiency of coupling to the output port 4001b.

In this regard, when the distance from the input and output ports 4001a and 4001b to the spatial light modulator 4004 is denoted as (s) and the distance between the input and output ports 4001a and 4001b is denoted as (d), the angle through which light is deflected by the spatial light modulator 4004 is expressed by Equation (8).

$$\theta \cong d/s \tag{8}$$

In Equation (8), (s) denotes both the distance from the input and output ports 4001a and 4001b to the spatial light modulator 4004 and the radius of curvature of the wavefront of the optical signal on the spatial light modulator.

When the principal beam of the optical signal output through the input port 4001a aligns with an optical axis, the waveguide providing the output port 4001b is preferably disposed a straight line resulting from subtraction of the angle θ expressed by Equation (8) from an intersecting point P between the spatial light modulator 4004 and the optical axis. This is shown in FIG. 5.

Figure 6:
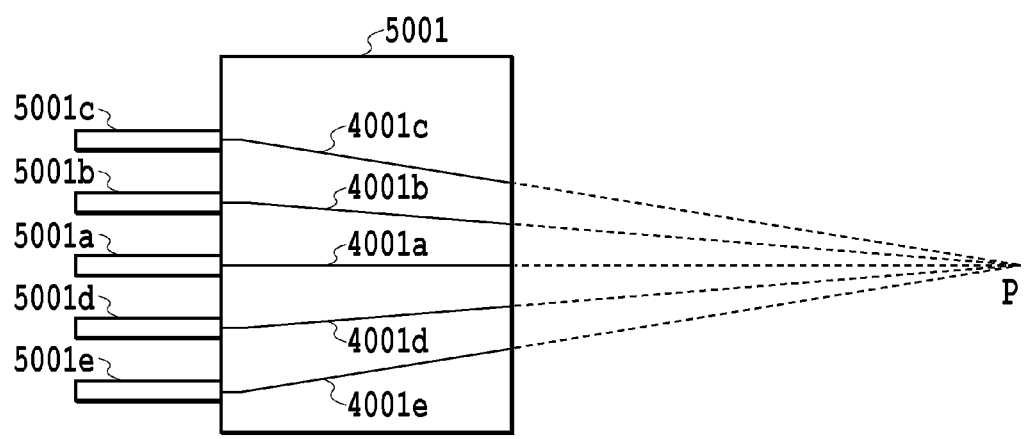
FIG. 6 is a diagram depicting a configuration example of an optical waveguide including input ports and output ports in the optical switch according to the second embodiment.

Now, a configuration example of the waveguide according to the second embodiment will be described with reference to FIG. 6. FIG. 6 is a diagram depicting a configuration example of a waveguide 5001 including the input waveguide 4001a and the output waveguides 4001a, 4001b, and 4001c.

As shown in FIG. 6, the optical waveguide 5001 includes three output waveguides (output ports) 4001c, 4001d, and 4001e disposed thereon in addition to the input waveguide 4001a serving as an input port and the output waveguide 4001b serving as an output port. FIG. 6 depicts a total of, for example, four output waveguides but five or more output waveguides may be disposed.

In FIG. 6, a point P is the same as the point P shown in FIG. 5, that is, the intersecting point between the spatial light modulator 4004 and the optical axis. The input and output ports 4001a to 4001e are disposed on radiations centered at the point P. Furthermore, input and output fibers 5001a to 5001e are provided in association with the output waveguides 4001a to 4001e, respectively. In FIG. 6, the effect of Snell's law associated with emission into the space through the optical waveguide is neglected, but the essence of the configuration remains unchanged.

<Third Embodiment>

Now, an optical switch according to a third embodiment will be described.

For the optical switch shown in FIG. 5, the case where the optical switch includes no lens has been provided. However, a lens may be provided and disposed at any position. A configuration example of such an optical switch is shown in FIG. 7.

Figure 7:
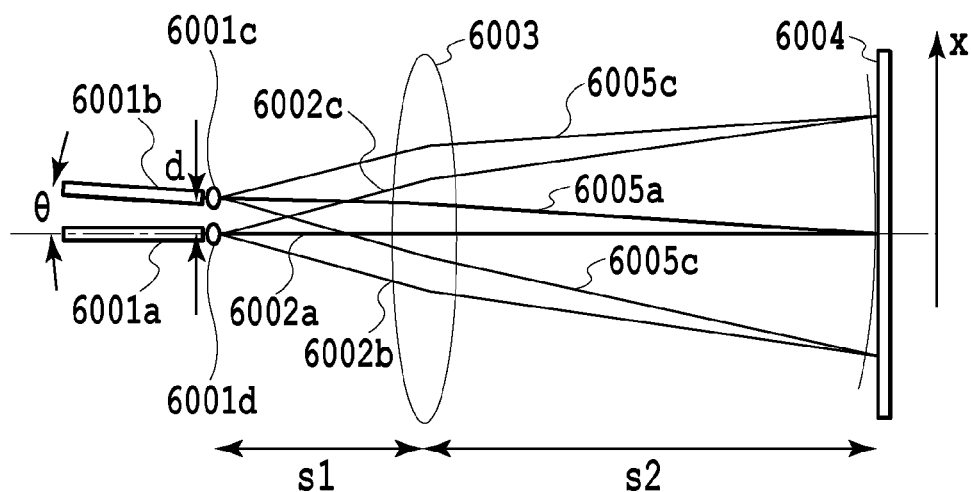
FIG. 7 is a diagram illustrating an optical path in a switching direction in an optical switch according to a third embodiment.

FIG. 7 is a diagram illustrating an optical path in a switching direction in an optical switch according to a third embodiment.

In the optical switch shown in FIG. 7, a lens 6003 may be positioned at a distance s1 from an input port 6001a and an output port 6001b and at a distance s2 from a spatial light modulator 6004.

In this case, an optical signal from the input port 6001a has a principal beam as shown by reference numeral 6002a. Beams of the optical signal propagate to the lens 6003 while being diverted as shown by reference numerals 6002a and 6002c.

After passing through the lens 6003, the optical signal propagates to the spatial light modulator 6004 with the beam width thereof reduced. Thus, the radius of curvature of the wavefront to be compensated for by the spatial light modulator 6004 is smaller than in the second embodiment. That is, the radius of curvature of beams of the optical signal entering the spatial light modulator 6004 when d1=s1 in Equation (5) is expressed by Equation (9).

$$R = s2 - d2 \tag{9}$$

In Equation (9), d2 denotes a negative value.

For example, when the focal distance (f) of the lens=100 mm, s=100 mm, s1=50 mm, and s2=50 mm, the optical system according to the third embodiment has an overall length s1+s2=100 mm. Since the overall length of the optical system according to the second embodiment is also s=100 mm, the overall lengths of the optical systems according to the second and third embodiments are both 100 mm and are equal. On the other hand, the radius of curvature R of the wavefront to be compensated for by the spatial light modulator is R=s=100 mm according to the second embodiment, whereas R=149.9 mm according to the third embodiment based on Equation (5) and Equation (9). Thus, in the third embodiment, the radius of curvature R of the wavefront is smaller than in the second embodiment, and the wavefront has a gentle curve.

<Fourth Embodiment>

The optical switches have been described, but the present invention may be applied to wavelength selective switches. In the description of a fourth embodiment, the optical system according to the first embodiment is applied to a wavelength selective switch. However, application of the optical systems according to the second embodiment and the third embodiment produces substantially similar results.

Figure 8A:
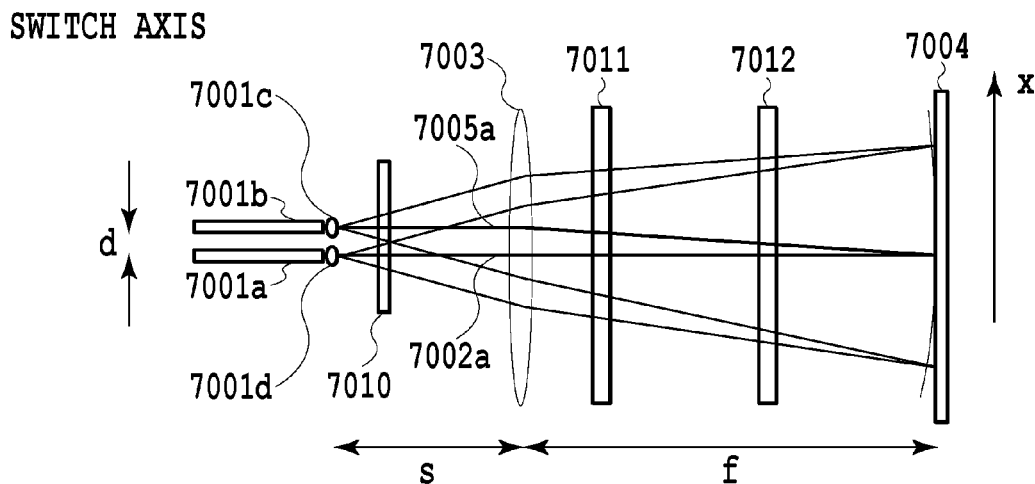
FIG. 8A is a diagram showing a configuration example of a switch axis direction in an optical wavelength selective switch according to a fourth embodiment.
Figure 8B:
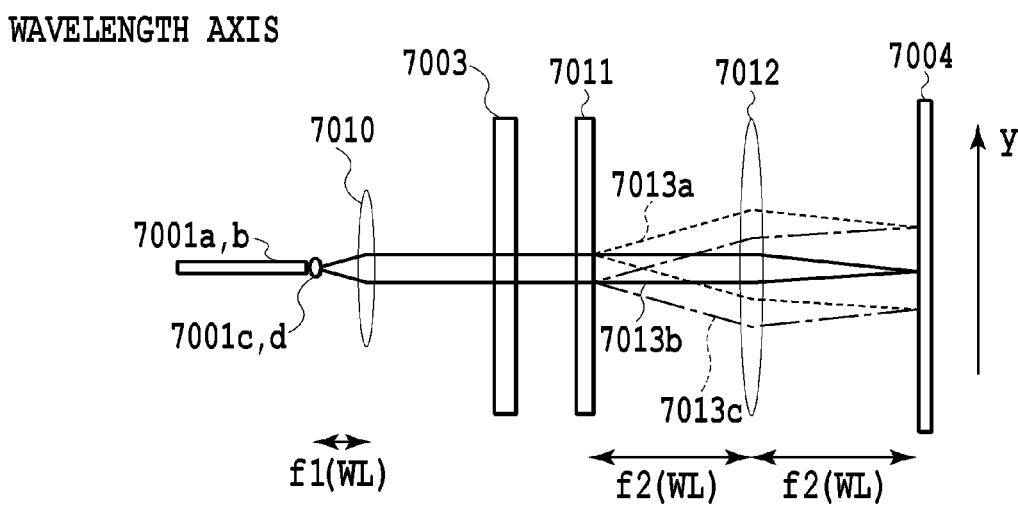
FIG. 8B is a diagram showing a configuration example of a wavelength axis direction in the optical wavelength selective switch according to the fourth embodiment.

FIG. 8A and FIG. 8B are diagrams depicting a wavelength selective switch according to a fourth embodiment. FIG. 8A depicts a configuration in a switch axis direction. FIG. 8B depicts a configuration in a wavelength axis direction. In FIG. 8A, (x) denotes the x axis shown in FIG. 3, and (y) denotes an axis orthogonal to the x axis.

The wavelength selective switch shown in FIG. 8A and FIG. 8B includes an input port 7001a, an output port 7001b, micro lenses 7001c and 7001d, a lens 7003, a collimate lens 7010, a dispersive lens 7011, a condensing lens 7012, and a spatial light modulator 7004.

The input and output ports 7001a and 7001b correspond to the input and output ports 2001a and 2001b according to the first embodiment. The micro lenses 7001c and 7001d correspond to the micro lenses 2001c and 2001d according to the first embodiment.

On the other hand, unlike the lens 2003 according to the first embodiment, the lens 7003 according to the fourth embodiment is a cylindrical lens with optical power only in the switch axis direction.

The collimate lens 7010 is, for example, cylindrical, and is provided at a distance f1 (WL) from the beam waist of the micro lens 7001d. The collimate lens 7010 converts incident light into parallel beams in the wavelength axis direction shown in FIG. 8B.

The dispersive element 7011 may be a transmissive diffraction grating, a reflective diffraction grating, a grism, or the like. In the fourth embodiment, a transmissive diffraction grating will be described by way of example.

As shown in FIG. 8B, the condensing lens 7012 is positioned so as to set a distance f2 (WL) between the dispersive element 7011 and the spatial light modulator 7004. In the fourth embodiment, the focal distance of the condensing lens 7012 is, for example, f2 (WL). WL is an abbreviation of the wave length.

Like the spatial light modulating section 2004 according to the first embodiment, the spatial light modulating section 7004 is, for example, an LCOS with a large number of fine pixels. The spatial light modulating section 7004 is configured to shift the phase of light incident on the LCOS, depending on the incidence position. As described below, the incidence position of the optical signal on the LCOS 7004 varies according to the wavelength. Thus, the spatial light modulating section 7004 enables phase shifting at each wavelength, allowing optical coupling of the respective wavelengths to the different output ports.

An optical signal from the input port 7001a is output to a free space through the micro lens 7001d. In this case, in the switch axis direction shown in FIG. 8A, the optical signal propagates to the lens 7003 while being dispersed, as is the case with the first embodiment. On the other hand, in the wavelength axis direction shown in FIG. 8B, the optical signal is converted by the collimate lens 7010 into parallel beams, which propagate to the lens 7003.

In the fourth embodiment, the lens 7003 is a cylindrical lens with optical power only in the switch axis direction, and the optical signal having passed through the lens 7003 enters the dispersive element 7011.

In FIG. 8B, the optical signal output from the dispersive element 7011 is diffracted in different directions depending on the wavelength of the signal. This is represented by a dashed line 7013a, a solid line 7013b, and an alternate long and short dash line 7013c.

Then, the optical signal having passed through the dispersive element 7011 is condensed in the wavelength axis direction by the condensing lens 7012 in the wavelength axis direction shown in FIG. 8B. The condensed optical signal enters the spatial optical modulating section 7004. The condensing lens 7012 according to the fourth embodiment is a cylindrical lens with optical power only in the wavelength axis direction.

Subsequently, the optical signal is subjected to spatial phase modulation and then reflected by the spatial light modulating section 7004, and coupled to the output port 7001b as is the case with the first embodiment. In this case, as shown in FIG. 8A and FIG. 8B, the optical signal entering the spatial light modulating section 7004 is reflected at different positions depending on the wavelength of the signal. This enables the respective wavelengths to be coupled to the different output ports.

In the fourth embodiment, the case where the dispersive element 7011 is provided between the lens 7003 and the condensing lens 7012 is illustrated. This is because the beam divergence in the switch axis direction shown in FIG. 8A is relatively small, allowing the performance of the dispersive element 7011 to be utilized. However, the dispersive element 7011 may be, for example, provided between the lens 7003 and the collimate lens 7010.

<Fifth Embodiment>

With reference to FIG. 4 and FIG. 6, the case has been described where optical waveguides are utilized as input and output ports and where the intervals between the input and output ports are reduced to have advantageous effects. Alternatively, an optical waveguide may be utilized on which various circuits are integrated together.

Figure 9:
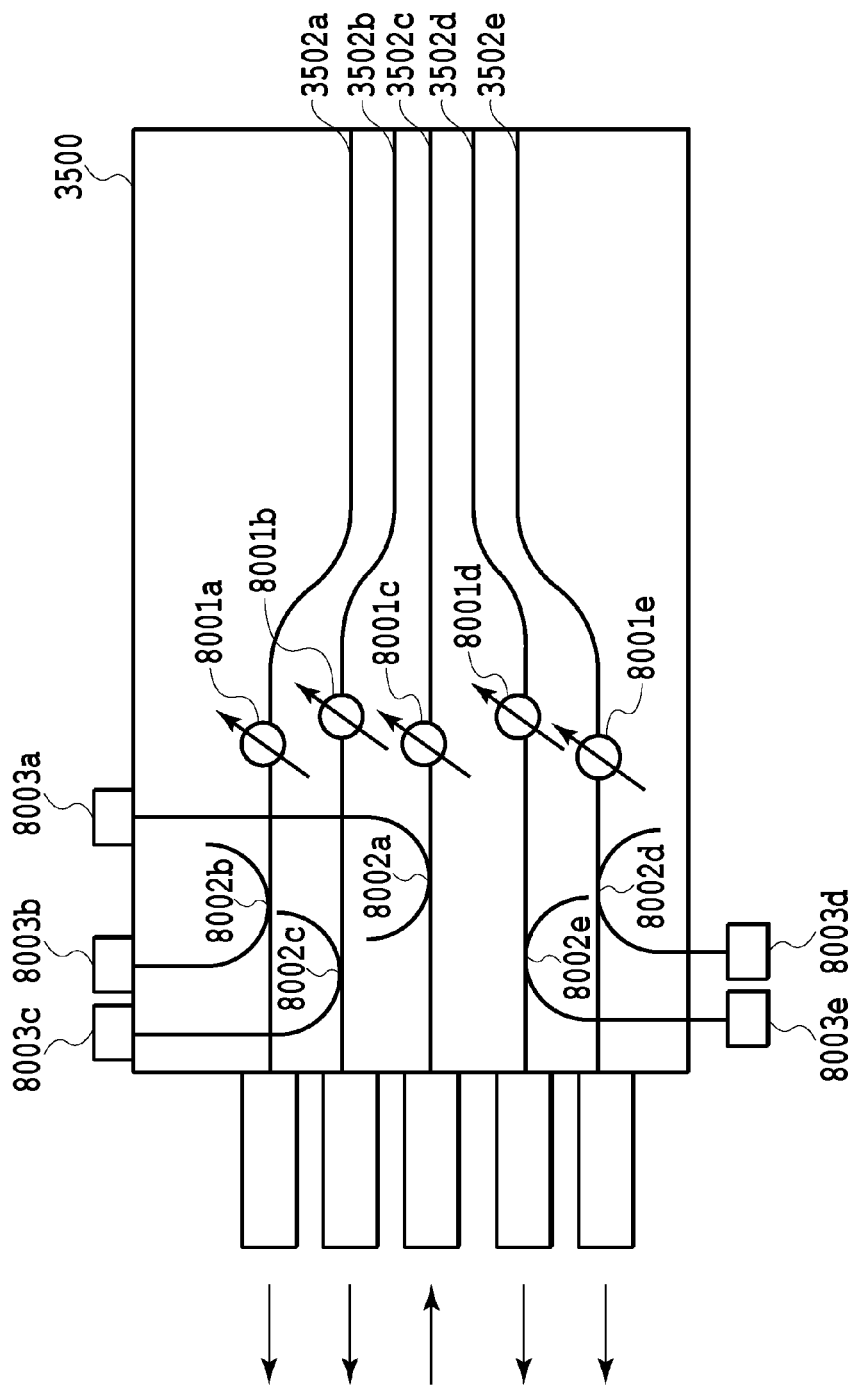
FIG. 9 is a diagram depicting a configuration example of an optical switch according to a fifth embodiment.
Figure 10:
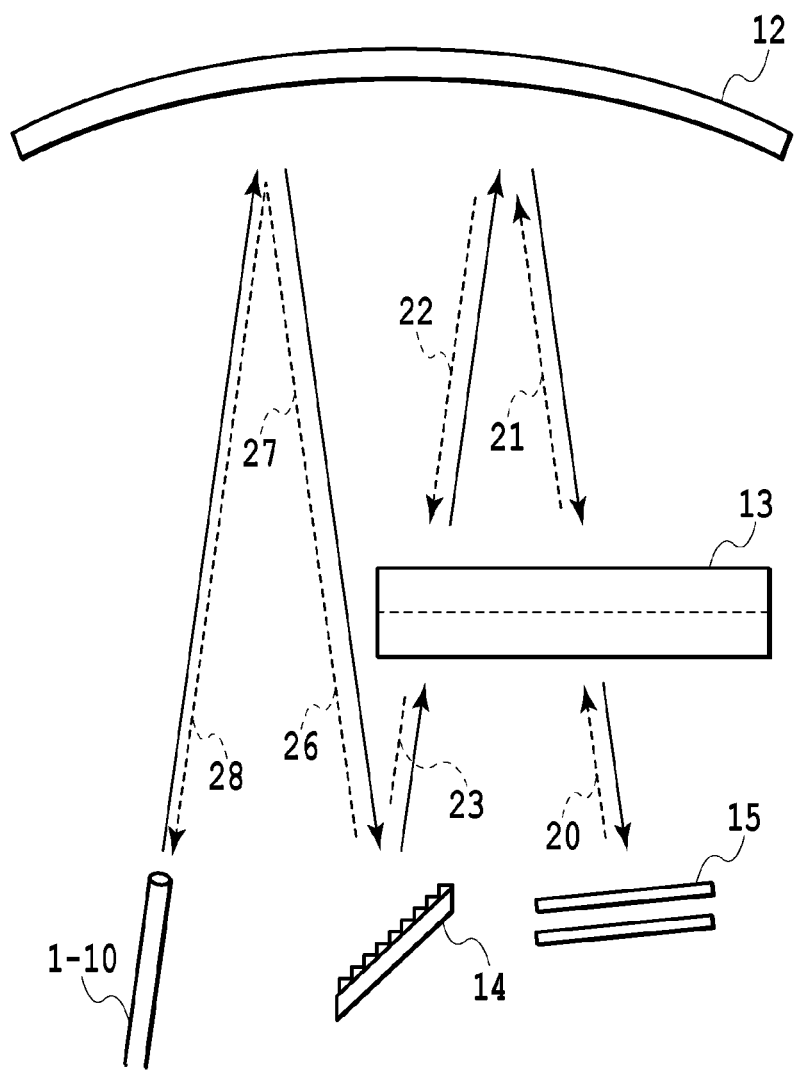
FIG. 10 is a diagram depicting an example of a conventional wavelength selective switch.

FIG. 9 is a diagram depicting a configuration example of an optical switch according to a fifth embodiment. The shown optical switch corresponds to a case where the input optical system according to the first embodiment is provided with additional functions.

In FIG. 9, variable attenuators 8001a to 8001e are provided on input and output waveguides 3502a to 3502e, respectively.

The applied variable attenuators 8001a to 8001e are Mach-Zehnder interferometers provided with variability based on a thermooptical effect.

The variable attenuators 8001a to 8001e enable propagation of an optical signal to be turned off when the optical switch itself becomes defective if the optical switch is set to prevent passage of light in a no power supply state, that is, set to be in a normally off state. This allows problems such as optical surge to be solved.

In FIG. 9, optical taps 8002a to 8002e connected to the input and output waveguides 3502a to 3502e partly branch optical signals from the input and output waveguides 3502a to 3502e to output the branched parts to light receiving elements 8003a to 8003e, respectively. In the fifth embodiment, an input signal is provided to the optical fiber 3502c, and output signals are provided to the optical fibers 3502a, 3502b, 3502d, and 3502e. The light receiving element 8003c allows the power of the input signal to be monitored. The light receiving elements 8003a, 8003b, 8003e, and 8003d allow the intensity of the output light to be monitored.

The applied optical taps 8002a to 8002e may be various optical waveguides such as directional couplers or wavelength insensitive couplers based on a multimode interferometer or a Mach-Zehnder interferometer.

The optical taps 8002a to 8002e and the light receiving elements 8003a to 8003e allow the amount of attenuation to be monitored when the optical switch is applied as a variable attenuator.

Moreover, when the optical switch according to the fifth embodiment is combined with the wavelength selective switch according to the fourth embodiment, this configuration enables the functions of an optical channel monitor (OCM) or an optical performance monitor (OPM) to be implemented by selectively monitoring the intensity at each wavelength. Moreover, the configuration may be provided with various functions other than the above-described functions of an attenuation amount monitor, an OCM, and an OPM, by appropriately changing the direction of a monitor circuit.

At the input ports and the output ports according to the above-described embodiments, optical switches, optical taps, optical VOAs, optical monitors, or composite components thereof may be integrated together by arranging Mach-Zehnder interferometers or directional couplers.

<Variation>

In the above-described embodiments, the case has been illustrated where the principal beam of the optical signal output from the input port appears on the optical axis of the optical system. However, since the optical switch operates even when the disposition of the input and output ports is changed, a similar configuration may be used when the principal beam fails to appear on the optical axis of the optical system.

In the above-described embodiments, two or more input ports and/or output ports may be provided.

A sixth to an eighth embodiments of the present invention will be described below with reference to the drawings.

<Sixth Embodiment>

Figure 11A:
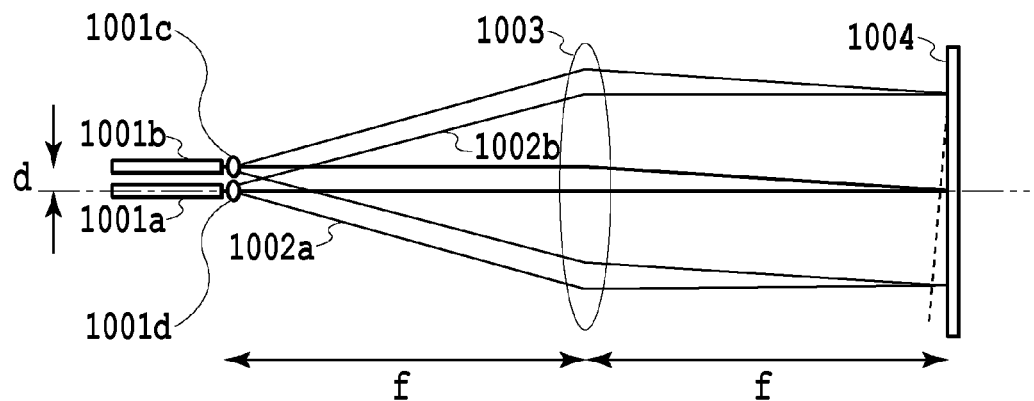
FIG. 11A is a diagram depicting an optical system of a conventional optical switch.
Figure 11B:
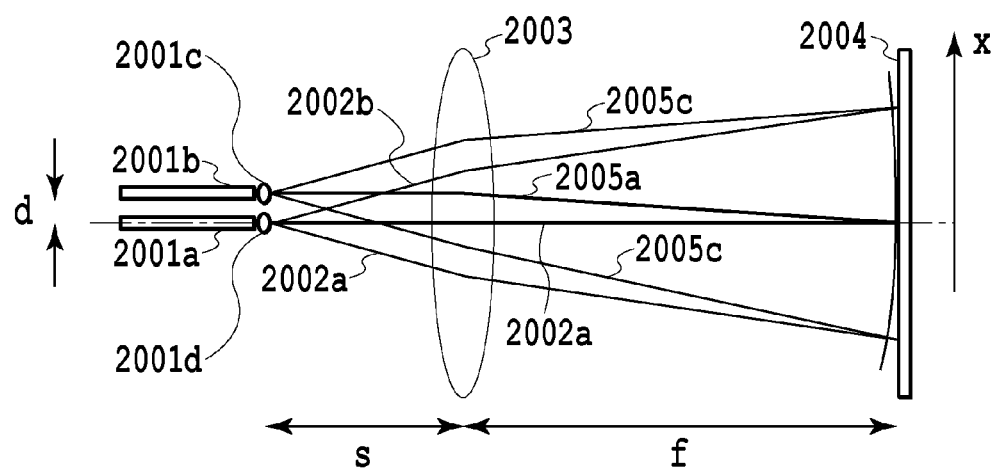
FIG. 11B is a diagram depicting an example of an optical system of an optical switch according to a sixth embodiment.

FIG. 11A depicts a general configuration of an optical system of a conventional optical switch. FIG. 11B depicts a general configuration of an optical system of an optical switch according to a sixth embodiment. FIG. 11A and FIG. 11B are the same as FIG. 1 and FIG. 2, respectively, and will thus not be described below.

Figure 12A:
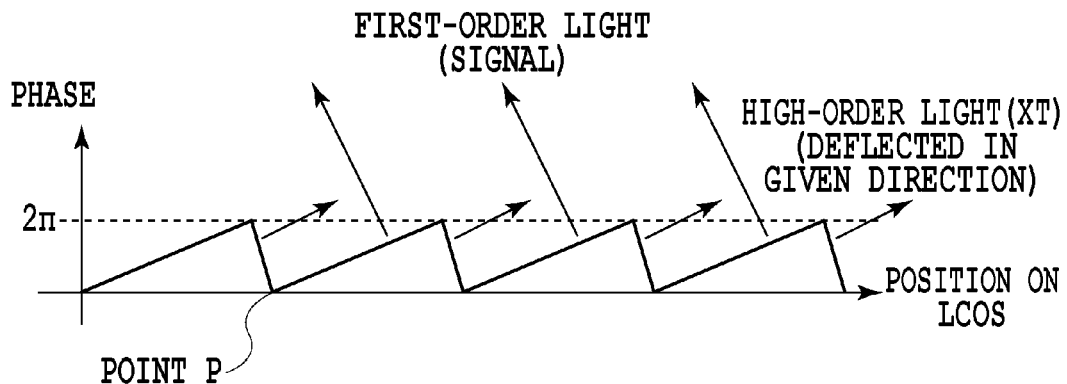
FIG. 12A is a diagram illustrating phase setting in the optical system of the conventional optical switch.
Figure 12B:
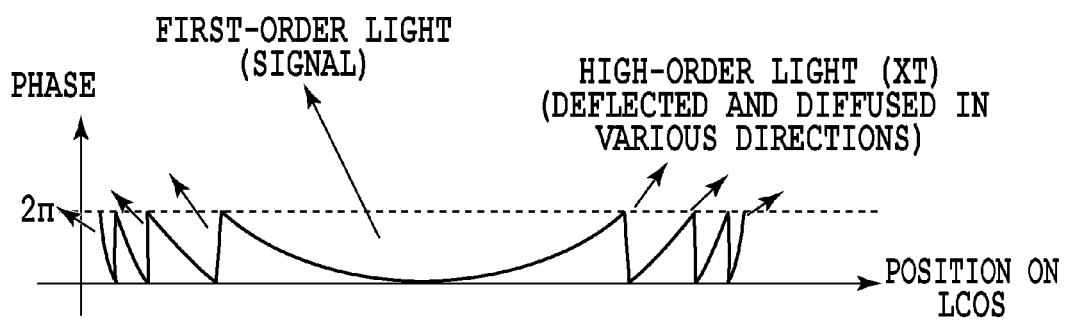
FIG. 12B is a diagram depicting an example of phase setting in the optical system of the optical switch according to the sixth embodiment.

In the optical systems in FIG. 11A and FIG. 11B, phase distributions shown in FIG. 12A and FIG. 12B, respectively, are set for LCOS elements. In the sixth embodiments, wavefronts entering the LCOS elements have finite radii of curvature. That is, the wavefronts are not plane waves.

FIG. 12A depicts phase setting in the optical system of the conventional optical switch. FIG. 12B depicts phase setting in the optical system of the optical switch according to the sixth embodiment.

In general, spatial light modulating elements such as the LCOS have a phase modulation index limited to approximately $2\pi$. In this case, a technique is generally used in which, to apply a linear phase distribution in order to implement optical switching, the phase is periodically turned back at $2\pi$ to equivalently provide a linear phase distribution. For example, in an example in FIG. 12A, discontinuous phase changes are needed in an area where the phase changes from $2\pi$ to 0. However, the spatial light modulating elements such as the LCOS fail to implement discontinuous phase changes at the point P. This is due to the interference of electric fields between adjacent pixels in the LCOS element and the continuity of the liquid crystal elements. That is, near the point P, an area is defined where the phase setting changes rapidly and continuously from $2\pi$ to 0. The optical signal in this area undergoes a slope phase change from $2\pi$ to 0. Thus, as shown in FIG. 12A, the area appears with the same periodicity as that of the linear slope that allows a switching operation to be implemented. The optical signal associated with the area generates high-order diffracted light, causing crosstalk.

Figure 13A:
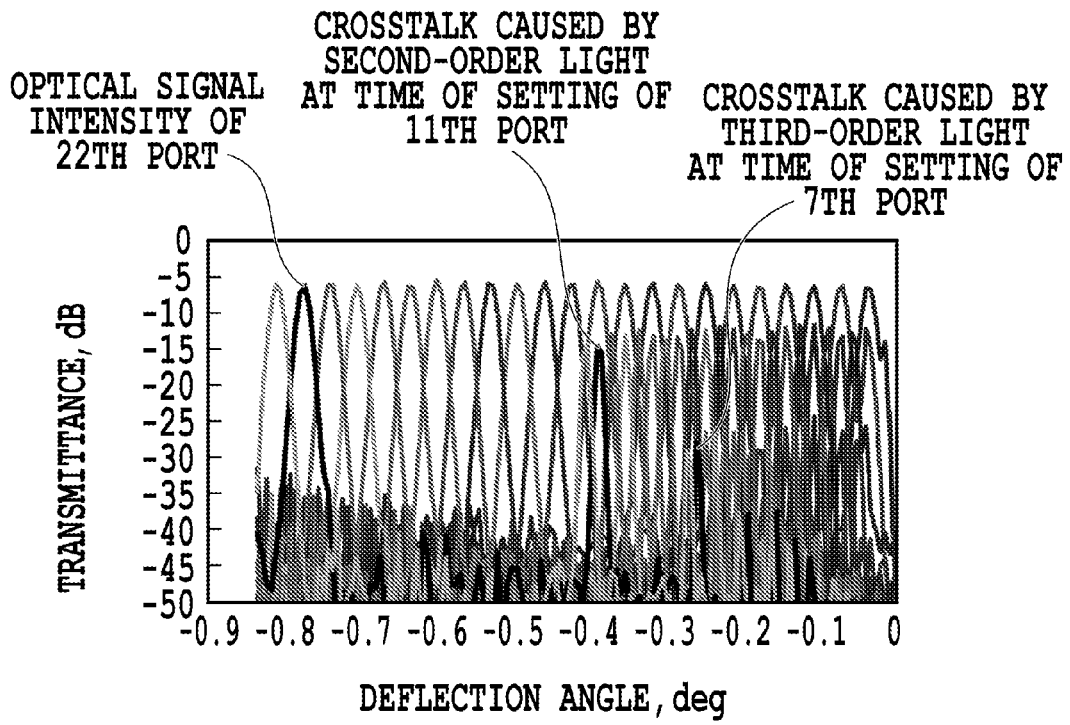
FIG. 13A is a plot depicting the intensity of an optical signal coupled to output ports when a phase distribution is set for the optical system of the conventional optical switch.
Figure 13B:
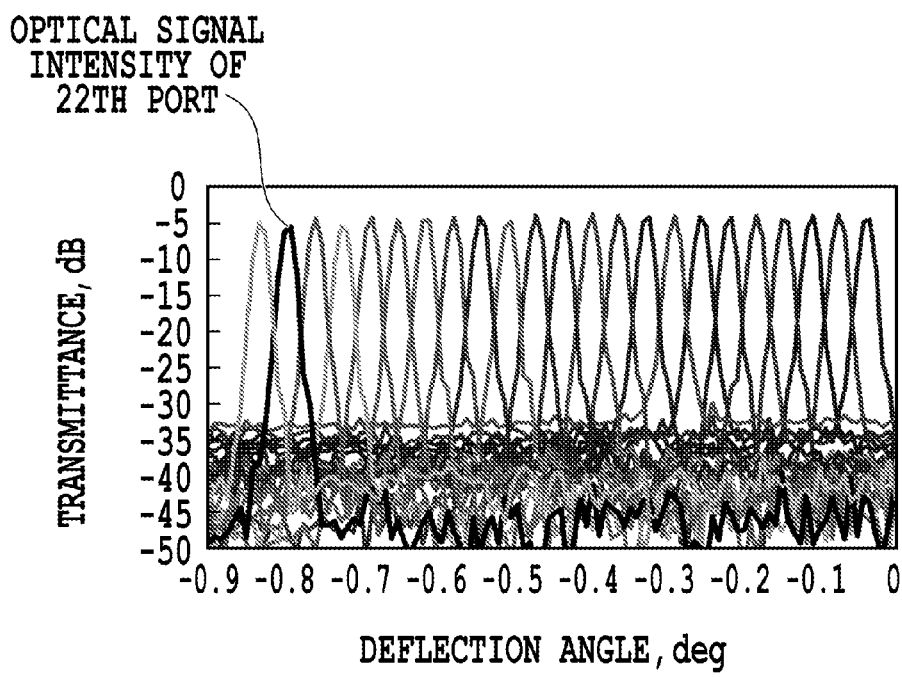
FIG. 13B is a plot depicting the intensity of an optical signal coupled to output ports when a phase distribution is set for the optical system of the optical switch according to the sixth embodiment.

FIG. 13A is a plot depicting the intensities of optical signals coupled to the output ports when a phase distribution is set for the optical system of the conventional optical switch. FIG. 13B is a plot depicting the intensities of optical signals coupled to the output ports when a phase distribution is set for the optical system of the optical switch according to the sixth embodiment.

In FIG. 13A, the axis of abscissas represents a deflection angle at which the beam is deflected by the LCOS element. The axis of ordinate represents the optical intensity. Furthermore, in FIG. 13A, the number of output ports is 23, and the optical intensities of the respective output ports are plotted with different lines. A thick line in FIG. 13A indicates the dependence of the 22th port (the second port from the outermost angle) on the deflection angle of the optical signal.

FIG. 13A depicts crosstalk (thick line) occurring at the 22th port (deflection angle: −0.8°) when an output is set for the 11th port (deflection angle: −0.4°). As the deflection angle associated with the LCOS is increased, most of the optical signal is coupled to the 22th port at a deflection angle of approximately 0.8°. However, the FIG. 13A also indicates that, even when the optical signal is routed to the 11th port with the deflection angle set to approximately 0.4°, light of approximately −15 dB is coupled to the 22th port. This is because, when light is coupled to the 11th port, relevant second-order diffracted light is coupled to the 22th port.

Moreover, FIG. 13A indicates that, when light is routed to the 7th port (deflection angle: 0.26°), relevant third-order diffracted light is coupled to the 22th port at an intensity of approximately −30 dB. An area where such high-order diffracted light is not coupled to the port is an area from the 12th port to the 23th port. This indicates that avoidance of worsening of crosstalk caused by high-order diffracted light needs avoidance of disposition of an output port in an interior angle area with a deflection angle of 0 to 0.4°.

On the other hand, FIG. 12B depicts an example of a phase distribution set for the optical system according to the sixth embodiment. In the optical system according to the sixth embodiment in FIG. 11B, the optical signal entering the LCOS, which is a light deflecting element, as a spherical wave (a cylinder surface with a radius of curvature only in the switch axis) with a curved phase distribution in the switch axis direction. The LCOS element implements switching by providing a superimposition of a phase distribution that corrects the spherical plane and a phase distribution that contributes to deflection.

In the optical system according to the sixth embodiment, the phase distribution provided to the LCOS element needs to be turned back at $2\pi$ as is the case with the conventional optical system. However, as seen in FIG. 12B, the position where the turn-back from $2\pi$ to 0 occurs has no periodicity. Thus, reflected light beams resulting from the incompleteness (discontinuity) of the turn-back are diffused to different areas.

FIG. 13B is a plot of the intensity of the optical signal coupled to input and output ports of the optical switch in the optical system according to the sixth embodiment. As is the case with FIG. 13A, the axis of abscissas represents the deflection angle at which the beam is deflected by the LCOS element. The axis of ordinate represents the optical intensity of each output. In FIG. 13B, the $2\pi$ turn-back is aperiodic, and thus, high-order diffracted light dissipates, preventing the above-described crosstalk. FIG. 13B indicates that, for example, in the conventional optical system, when outputs are set for the first port to the 11th port, high-order diffracted light is not generated which is otherwise generated at output ports present at the positions of a double angle and a triple angle. This is because, in the phase setting in FIG. 12B, the turn-back from $2\pi$ to 0 has no periodicity, preventing high-order diffracted light from being generated at particular positions. Optical energy contributing to high-order diffracted light is diffused and evenly distributed in various directions of the deflection angle. FIG. 13B indicates that the crosstalk thus evenly increases at −35 dB.

In the conventional optical system, disposition of a port in an interior angle area with a deflection angle of 0° to 0.4° needs to be avoided in order to avoid high-order diffracted light. However, in the optical system according to the sixth embodiment, ports can be disposed at interior angles. In other words, the optical system according to the sixth embodiment secures a double number of output ports compared to the conventional optical switch, enabling a large-scale switch to be implemented. The sixth embodiment reduces the number of ports prevented from being used due to crosstalk, and can thus exert an effect that enables halving of the beam deflection angle of the LCOS needed to secure the same number of ports.

The optical system according to the sixth embodiment further enables the beam deflection angle of the LCOS to be halved in securing the same number of ports. That is, the height of the optical system can be halved, contributing to implementing a lower-profile optical system and enabling an optical switch module to be miniaturized.

<Seventh Embodiment>

In the first embodiment, the case where second-order phase setting is performed on the LCOS, a spatial light modulating element, has been described for easy description (Equation (2) in the first embodiment). However, strictly speaking, a spherical plane (a cylindrical plane with a radius of curvature only in the switch axis) is preferable. That is, preferably, the wavefront of the optical signal entering the LCOS is, to be exact, a spherical plane and is expressed by Equation (10). The radius of curvature of the wavefront entering the LCOS has a finite value. That is, the wavefront is not a plane wave.

$$\phi(x) = R - \sqrt{R^2 - x^2} \tag{10}$$

Here, R denotes the radius of curvature of the wavefront. In this case, a liner phase distribution associated with beam deflection at the time of switching is expressed by Equation (11).

$$\phi(x) = R - \sqrt{R^2 - x^2} + bx \tag{11}$$

<Eighth Embodiment>

Figure 14:
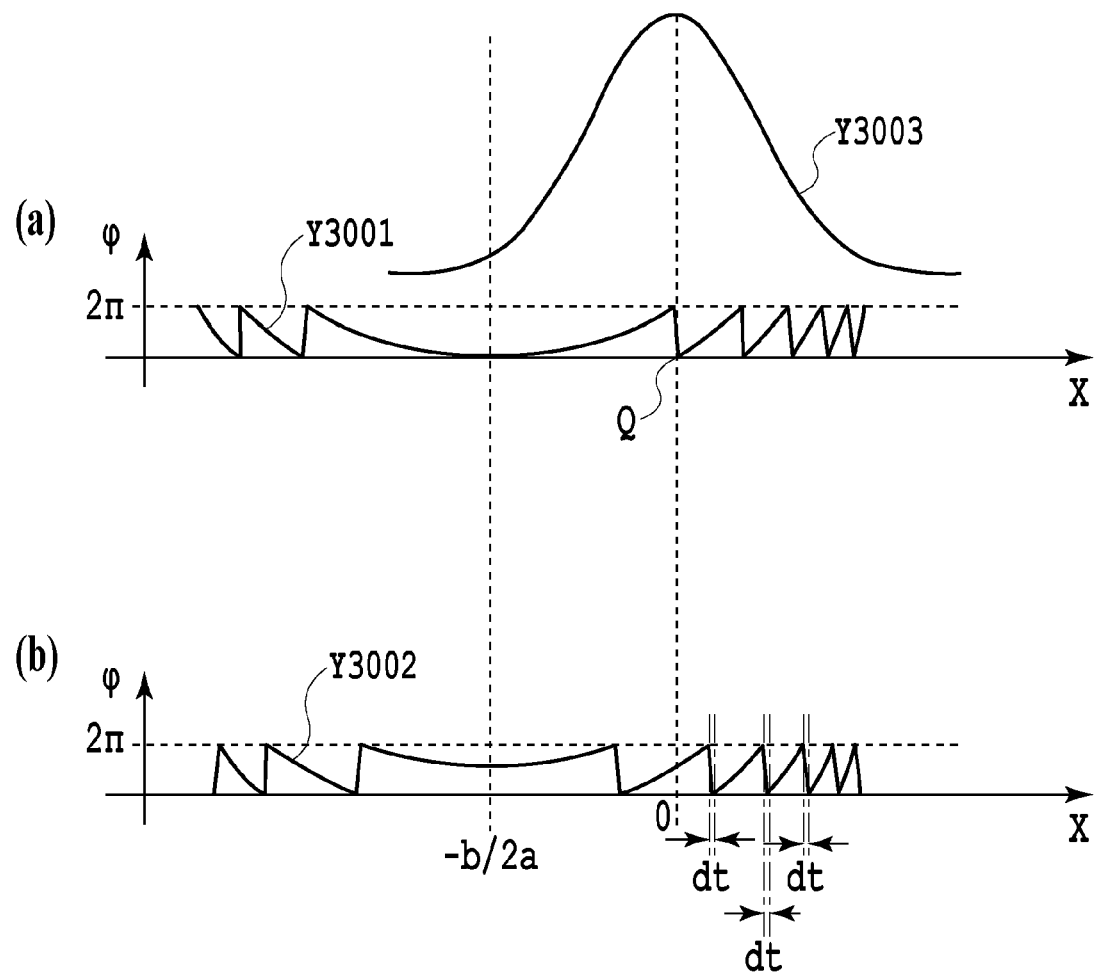
FIG. 14 is a diagram illustrating phase setting on a spatial light modulating element according to a seventh embodiment.
Figure 15A:
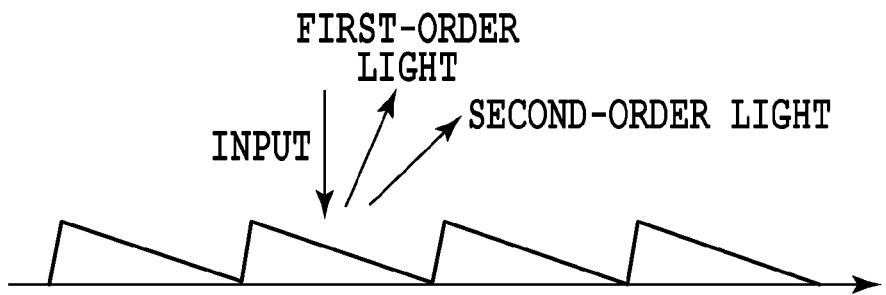
FIG. 15A is a diagram depicting how phase changes with respect to an input in switching of a conventional wavelength selective switch.
Figure 15B:
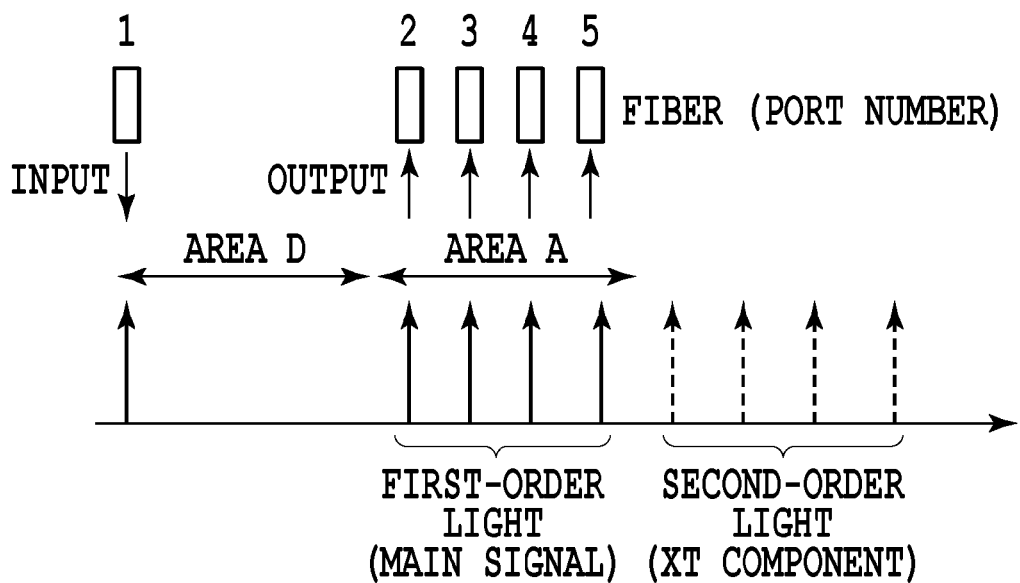
FIG. 15B is a diagram depicting how high-order diffracted light is generated in the switching of the conventional wavelength selective switch.

FIG. 14 is a diagram illustrating phase setting on the spatial light modulating element according to the seventh embodiment. FIG. 14(a) depicts an optical intensity distribution resulting from a superimposition of a first-order phase distribution and a second-order phase distribution. FIG. 14(b) depicts an optical intensity distribution corresponding to the optical intensity distribution in FIG. 14(a) with a phase offset set. For easy description, the eighth embodiment will be described in conjunction with the phase distribution of a quadratic curve according to the first embodiment instead of the phase of a complete spherical wave according to the seventh embodiment. However, the description also applies to the complete spherical wave.

In the optical system according to the eighth embodiment, a phase distribution set for the LCOS is a superimposition of a second-order phase distribution for wavefront compensation and a phase distribution for deflection as described in the first embodiment. A curve resulting from a superimposition of a second-order curve and a first-order curve is a quadratic curve. In this regard, when the slope of a second-order curve component is dented as (a) and the slope of a first-order curve component is dented as (b), the resultant quadratic curve has an axis shifted by −b/2a. The superimposed phase distribution has a distribution structure in which the phase is turned back at the upper limit value (for example, $2\pi$) of the phase that can be set by the LCOS. In this case, the turn-back structure may be provided at a position where an optical intensity distribution Y3003 on the LCOS is maximized. This is because the center of the intensity distribution of the beam entering the LCOS is determined by the optical system and is constant regardless of the phase setting for the LCOS. FIG. 14(a) denotes the above-described case. FIG. 14(a) depicts the case where, when an optical signal with a distribution having the maximum intensity at the coordinate center Q of the LCOS is incident, the position of the $2\pi$ turn-back in the abode-described superimposed phase distribution aligns with the coordinate center Q. In this case, the incompleteness of the phase turn-back resulting from the $2\pi$ turn-back has a significantly adverse effect.

In contrast, the turn-back position can be shifted by adding an appropriate phase offset to the superimposed phase distribution as shown in FIG. 14(b). That is, the phase setting is such that, in addition to a second-order phase distribution with a slope (a) and a first-order phase distribution with a slope (b), a distribution with an additional constant (c) is assumed and turned back at every $2\pi$ as illustrated in Equation (12).

$$\phi(x) = ax^2 + bx + c \tag{12}$$

FIG. 14(b) depicts an example where the constant (c) is set to any value and where the $2\pi$ turn-back is shifted from the point where the optical intensity is maximized.

Preferably, a method for setting the constant (c) is as follows. That is, the width dt of the area where the $2\pi$ turn-back occurs is expected to be uniform over the entire area on the LCOS. Thus, the constant (c) may be determined so as to minimize the sum of integral values of the incident optical signals on the area.

The above-described phase setting enables a reduction in stray light resulting from the $2\pi$ turn-back, enabling worsening of crosstalk to be suppressed.

In Equation (12), the (a) is determined so as to compensate for the radius of curvature of the wavefront, and the (b) is determined to select a desired output port. The (c) may be determined as described below. That is, for $\phi(x)$ in Equation (12), the position where the turn-back from $2\pi$ to 0 occurs can be determined by Equation (13).

$$\phi(x) \bmod 2\pi = 0 \tag{13}$$

When the coordinates of the positions where the turn-back occurs are denoted by $x_1, x_2, x_3, \ldots, x_i$ (i is an integer), the (c) is determined which minimizes an evaluation function I expressed by Equation (14).

$$I = \sum_i \int_{-\frac{dt}{2}}^{\frac{dt}{2}} A(x - x_i) dx \tag{14}$$

A calculation method for minimizing the (c) is as follows. First, with the (c) varied from 0 to $2\pi$, the positions $x_1, x_2$, x3, ..., xi where the turn-back occurs are determined using Equation (13). Each time the position is determined, the evaluation function I is calculated in accordance with Equation (14) to determine the (c) that minimizes the I. However, the eighth embodiment is not limited to this method, and the value that minimizes the (c) may be determined using an optimization method such as a bisection method or a steepest descent method.

In this regard, A in Equation (14) denotes the intensity distribution of light entering the LCOS and is generally expressed by a Gauss function in Equation (15).

$$A(x) = e^{-2(\frac{x}{w})^2} \qquad (15)$$

Apparently, for the Gauss function in Equation (15), the (c) may be optimized in accordance with the intensity distribution of light entering the LCOS.

As described above, according to the eighth embodiment, the constant (c) allows the signal incident on the LCOS to be minimized in the areas where the phase is turned back at $2\pi$. Thus, light entering the position where the phase is discontinuously changed is minimized, effectively allowing optical characteristics to be optimized.

REFERENCE SIGNS LIST 2001a, 4001a, 6001a Input port
2001b, 4001b, 6001b Output port
2003 Lens
2004, 4004, 6004 Spatial light modulator

The invention claimed is:

1. An optical switch comprising:
   at least one input port;
   at least one output port;
   a spatial light modulating section receiving an optical signal from the input port to deflect the optical signal to a selected one of the output ports; and
   an optical lens disposed between the spatial light modulating section and the at least one input port and the at least one output port, and
   wherein for the spatial light modulating section a phase distribution is set, the phase distribution comprising a superimposition of a phase distribution with a radius of curvature identical to a radius of curvature of a wavefront of the optical signal obtained at a time of incidence and a phase distribution that allows the deflected optical signal to be coupled to the output port,
   the radius of curvature of the wavefront at the time of incidence on the spatial light modulating section has a finite value.

2. The optical switch according to claim 1, wherein a distance between the optical lens and the spatial light modulating section is set to be identical to a focal distance of the optical lens, and
   a distance between the optical lens and the at least one input ports and the at least one output ports is set to be different from a Rayleigh length of a virtual beam waist with respect to an optical signal entering the spatial light modulating section.

3. The optical switch according to claim 2, wherein the at least one input port and the at least one output ports are formed in an optical waveguide on a substrate.

4. The optical switch according to claim 3, further comprising a spectroscopic element disposed between the spatial light modulating section and the at least one input port and the at least one output port.

5. The optical switch according to claim 4, wherein the at least one input port and the at least one output port are provided on an identical straight line, and a spectroscopic surface of the spectroscopic element and the straight line are provided along a normal of a demultiplexing surface.

6. The optical switch according to claim 5, wherein one of an optical directional coupler, a multimode interference coupler, and a Mach-Zehnder interferometer is connected to the at least one input ports and the at least one output port formed in the optical waveguide.

7. The optical switch according to claim 6, wherein light receiving elements are provided at ports branched from the at least one input and output ports by the optical directional coupler, the multimode interference coupler, or the Mach-Zehnder interferometer.

8. The optical switch according to claim 2, further comprising a spectroscopic element disposed between the spatial light modulating section and the at least one input port and the at least one output port.

9. The optical switch according to claim 8, wherein the at least one input port and the at least one output port are provided on an identical straight line, and a spectroscopic surface of the spectroscopic element and the straight line are provided along a normal of a demultiplexing surface.

10. The optical switch according to claim 9, wherein one of an optical directional coupler, a multimode interference coupler, and a Mach-Zehnder interferometer is connected to the at least one input port and the at least one output port formed in the optical waveguide.

11. The optical switch according to claim 10, wherein light receiving elements are provided at ports branched from the at least one input and output ports by the optical directional coupler, the multimode interference coupler, or the Mach-Zehnder interferometer.

12. The optical switch according to claim 1, wherein the spatial light modulating section is provided with a superimposition of a phase distribution with a radius of curvature identical to the radius of curvature of the wavefront of the optical signal obtained at the time of incidence on the spatial light modulating section and a phase distribution that allows a principal beam of the optical signal to be directed toward the selected output port when the optical signal exits the spatial light modulating section, and
   a phase distribution with a constant phase applied over an entire surface of the spatial light modulating section is set for the spatial light modulating section.

13. The optical switch according to claim 12, wherein the constant phase is determined such that a non-ideal point for the phase set for the spatial light modulating section minimizes a degree of contribution weighted by an intensity distribution of the optical signal entering the spatial light modulating section.

* * * * *